United States Patent [19]

Mohr

[11] Patent Number: 4,722,299
[45] Date of Patent: Feb. 2, 1988

[54] TOY FOR ENTERTAINING A CAT
[75] Inventor: Robert B. Mohr, Arlington, Tex.
[73] Assignee: Doskocil Manufacturing Co., Inc., Arlington, Tex.
[21] Appl. No.: 816,361
[22] Filed: Jan. 6, 1986
[51] Int. Cl.[4] .................. A01K 15/02; A63H 33/00
[52] U.S. Cl. ................................ 119/29; 446/170
[58] Field of Search ............. 119/29, 29.5; 446/227, 446/419, 168, 170, 265

[56] References Cited

U.S. PATENT DOCUMENTS

| | | | |
|---|---|---|---|
| 591,876 | 10/1897 | Pace | 446/170 |
| 979,038 | 12/1910 | Seiler | 446/419 |
| 1,401,859 | 12/1921 | Bailey | 446/419 |
| 2,466,116 | 4/1949 | Marong | 446/170 |
| 2,644,270 | 7/1953 | Marong | 446/170 |
| 2,946,152 | 7/1960 | Rubin | 446/265 |
| 3,315,640 | 4/1967 | Gamble | 119/29 |
| 4,154,018 | 5/1979 | Churchman | 446/419 |
| 4,238,904 | 12/1980 | Lang | 446/168 |

FOREIGN PATENT DOCUMENTS

| | | | |
|---|---|---|---|
| 636754 | 2/1962 | Canada | 446/170 |
| 578539 | 7/1946 | United Kingdom | 446/419 |

Primary Examiner—Robert P. Swiatek
Attorney, Agent, or Firm—Charles W. McHugh

[57] ABSTRACT

An article of manufacture having utility as a toy for entertaining domestic cats. The toy includes an elongated housing having a top, a bottom and two spaced structures (such as walls) for connecting the top and bottom. The housing may be linear or it may be in the form of an annulus or a triangle or a figure 8 or some other "closed loop" figure. At least one of the connecting structures has an elongated opening or slot through which a cat can insert a paw. The bottom of the housing has a configuration to support a ball in rolling contact. A ball is captured within the housing and is sized for rolling along the bottom of the housing. Also, the size of the ball is such that it will not pass through the elongated opening in the connecting structure, so that the cat may reach through the elongated opening in the connecting structure in order to swat the ball and cause it to roll within the housing, but the cat is prevented from extracting the ball from the housing. The preferred shape and size for the housing is an annulus having an ID of about 12 inches, so that the cat may curl up and sleep within the housing after it has tired of trying to capture the ball. A piece of carpet attached to a central panel is likely to foster the cat's use of the toy as a bed.

6 Claims, 6 Drawing Figures

TOY FOR ENTERTAINING A CAT

BACKGROUND OF THE INVENTION

This invention relates generally to a toy having utility for entertaining domestic cats, more specifically, it relates to an article of manufacture which has a captured ball with which a cat may play—but only in a controlled manner.

Some of the more popular domestic pets which humans have seen to fit to host have been domestic cats. And, it is well known that cats are entertained by moving objects such as balls and simulated mice, etc. In particular, cats seem to be especially attracted to movable things that they can maneuver. Balls of twine and similar round objects that a cat can propel across a floor seem to have special appeal. However, a disadvantage of free-rolling objects is that they frequently tend to pass underneath obstacles such as refrigerators, couches, bookcases and other pieces of furniture, which makes it difficult for either the cat or the owner to retrieve the object, with the result that an interesting game of chase is suddenly terminated.

Also, there is the inherent risk that a cat may sometimes tire of playing with a ball or spool and abandon it in the middle of a hallway or room where it suddenly becomes a hazard to an unsuspecting person who is walking through the area without paying attention to the abandoned toy.

A further comment about cat behavior is that cats seem to lose interest in an object more quickly when they have achieved such a degree of control over it that the object is no longer "trying to escape." Those persons who have seen a cat chase after and catch a real mouse may recall that the cat's interest in the mouse seemed to wane when the mouse became still. When a mouse is dead or is no longer trying to escape, it ceases to be a challenge, and a typical cat rapidly becomes bored.

In view of these observations about a cat's natural behavior, it would be desirable to provide a toy for entertaining one or more cats, and which provides the challenge of a moving object (i.e., a ball) which can move in only a controlled path—and which can never become lost or wedged into a static condition.

It is another object to provide a toy which is configured in such a way that the housing of the toy serves a dual purpose in furnishing the type of enveloping structure that cats tend to find attractive for a regular sleeping area.

Still another object is to provide a toy which will have a more or less consistent appeal to a cat—at least as far as its movement characteristics are concerned, but which can be adjusted by the cat's owner for the noise it produces.

These and other objects will be apparent from a careful reading of the specification provided below, with appropriate reference to the attached drawings.

BRIEF DESCRIPTION OF THE INVENTION

In brief, the invention disclosed herein comprises an elongated housing having a top, a bottom, and two spaced structures—such as walls—for connecting the top and bottom. At least one of the connecting walls has an elongated opening or slot through which a cat can insert a paw. The bottom of the housing has an interior configuration such that it will support a ball in rolling contact, and a ball is inserted into the housing so that the cat may both see it and cause it to move. The size of the ball is selected so that it will not pass through the slot, in order that the cat can never remove the ball from the housing. As the cat swats at the ball and causes it to roll, the ball will travel along whatever path is defined by the housing. Suitable housing configurations include a circle and a square and variations thereof, such that the travel path of the captured ball constitutes essentially an endless loop. Other configurations for the housing include a figure eight and a straight line. In all configurations of the housing it is believed to be important that the cat be able to see the motion of a struck ball at least most—if not all—of the time. This feature is one of the primary distinguishing characteristics of the present toy in comparison with the one disclosed in U.S. Pat. No. 3,648,403 to Gommel entitled "Play Toy for Felines, Dogs and Children", which is the closest prior art known to this inventor.

The top of the housing is preferably capable of being separated from the bottom at will, so that any given ball may be selectively replaced with another ball, such as one that is either very quiet (e.g., a soft rubber ball) or rather noisy (e.g. a hollow ball containing a bell-like device). A panel constituting a floor may be placed in the interior of the housing; and, covering that floor with a carpet-like material will establish a good sleeping area.

The word "rolling" as used herein should be understood to be a general and not a technical term. That is, the action which results from a cat striking a ball may literally be rolling, sliding or a combination of both; but it is the motion of a captured ball that is important, to the cat, so no attempt will be made herein to distinguish between pure rolling and the kind of movement that a physicist would describe as sliding.

DETAILED DESCRIPTION OF THE PREFERRED EMBODIMENTS

Figure 1:
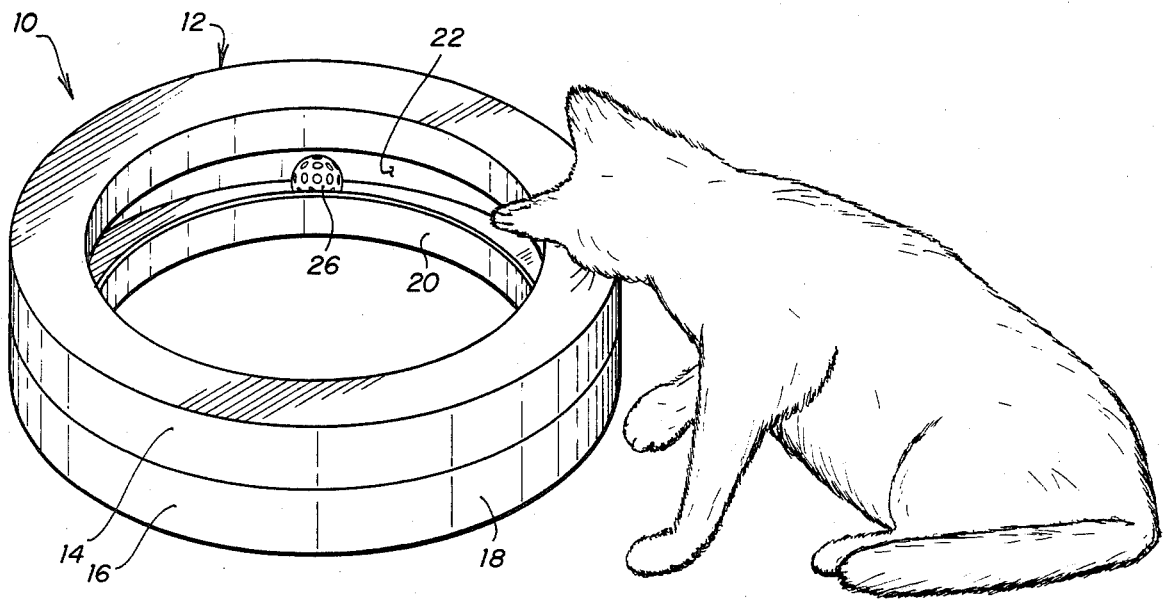
FIG. 1 is a perspective view of a preferred embodiment of a cat toy, wherein the housing for a captured ball is annular.

Referring initially to FIG. 1, a toy 10 intended for use by domestic cats is shown in its preferred configuration—which is annular (or circular) and having an inner diameter of about 12 inches. This size is preferred so that an average adult cat may play with the toy and may also curl up and sleep inside it—and the inner walls of the toy will provide a surrounding shell for the cat. To this end, the toy 10 preferably comprises an elongated housing 12 with a top 14, a bottom 16 and two spaced structures 18, 20 for connecting the top and bottom. The housing 12 may be endless as shown in FIG. 1, or it may have any of several other configurations, as will be explained later. At least one of the two connecting structures 18, 20 has an elongated opening 22—like a slot—through which a cat can readily insert a paw. The housing bottom 16 has an external surface which is preferably smooth so that the toy 10 may be placed on furniture without scratching the furniture; and the interior surface of the bottom 16 has a configuration such that it will support a ball in rolling contact. For simplicity, it is preferred to make both the interior and exterior surfaces of the bottom 16 smooth and essentially flat, but a bottom wall having an arcuate cross-section would also be quite serviceable.

Figure 2:
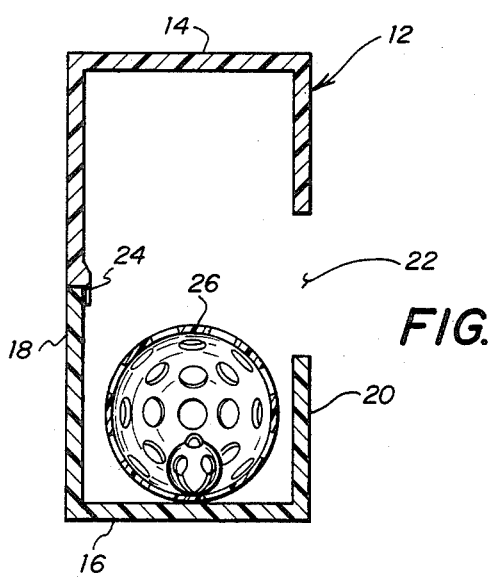
FIG. 2 is a transverse cross-sectional view of a portion of the housing shown in FIG. 1, with a typical ball shown resting on the smooth floor of the housing.

The two connecting structures 18, 20 are preferably walls which will be oriented vertically when the housing is positioned such that it is sitting horizontally on the floor or some other generally horizontal surface. The first connecting structure 18, which may also be described as the outer wall of the housing, is shown in FIG. 2 as being continuous in its extension from the housing top 14 to the bottom 16. The second connecting structure 20, which may also be described as the inner wall of the housing, is shown as being interrupted by elongated opening 22. As is clearly indicated in FIG. 2, the elongated opening 22 is centrally located in the inner wall 20, such that a transverse cross-section of the housing may accurately be described as generally C-shaped. Also evident in FIG. 2 is a preferred manner of assembling the housing 12 from two equal pieces, each of which constitutes one half of the housing. The pieces are arranged so that each half forms a mirror image of the other—and an annular cavity is created between the two "halves". A plurality of vertically oriented tabs 24 on each piece prevent sideward movement of the top pieces with respect to the bottom piece. In this manner, the housing top 14 may be lifted vertically so as to be selectively removed from the bottom 16, such that the interior of the housing may be cleaned at will.

Captured within the housing 12 is a ball 26 which is adapted for rolling along the housing bottom 16. The size of the ball 26 is such that it will not pass through the elongated opening 22 in wall 20, but the ball is not so large that it could touch the top 14 and bottom 16 simultaneously. That is, the ball must be capable of rolling freely within the housing 12, so that a cat may reach through the elongated opening 22 in order to swat the ball and cause it to roll within the housing. A reasonably tight fit between the top and bottom pieces of a two-piece housing will ensure, however, that the cat will be prevented from extracting the ball from the housing.

The nature of the ball 26 may be established by the owner of the toy, and the ball may either be solid or hollow, rigid or soft—depending upon the particular wishes of humans who are in the vicinity of the toy, or the personal preferences of one or more cats who are playing with the toy. One particularly appealing ball 26 is created by modifying a hollow plastic ball with which golfers routinely practice their swings, by inserting therein a small spherical bell of the type commonly used to amuse children, etc. The thin wall of a plastic golf ball can be slit with a knife for a short distance so as to permit the spherical bell to be pushed into the hollow ball. The memory of the plastic will soon cause the wall to return to its original shape—so that the ball 26 will again roll easily when it is struck, and the captured bell will provide a gentle noise as the ball rolls. However, even a gentle noise can become bothersome if it is repeated for a long period of time; therefore, it will behoove the toy owner to keep in reserve a "quiet" ball made of sponge rubber or the like, so that a cat may continue to be entertained by the toy without adversely affecting someone's nerves. Some cats have been found to be relatively insensitive to any change in the noise-making characteristics of a ball 26, presumably because it is the motion of a captured ball that attracts them. Other cats have been found to be more interested in a noisy ball than a quiet one; so, the preferences of a particular cat can perhaps be respected when an owner decides what kind of a ball is to be utilized.

Figure 3:
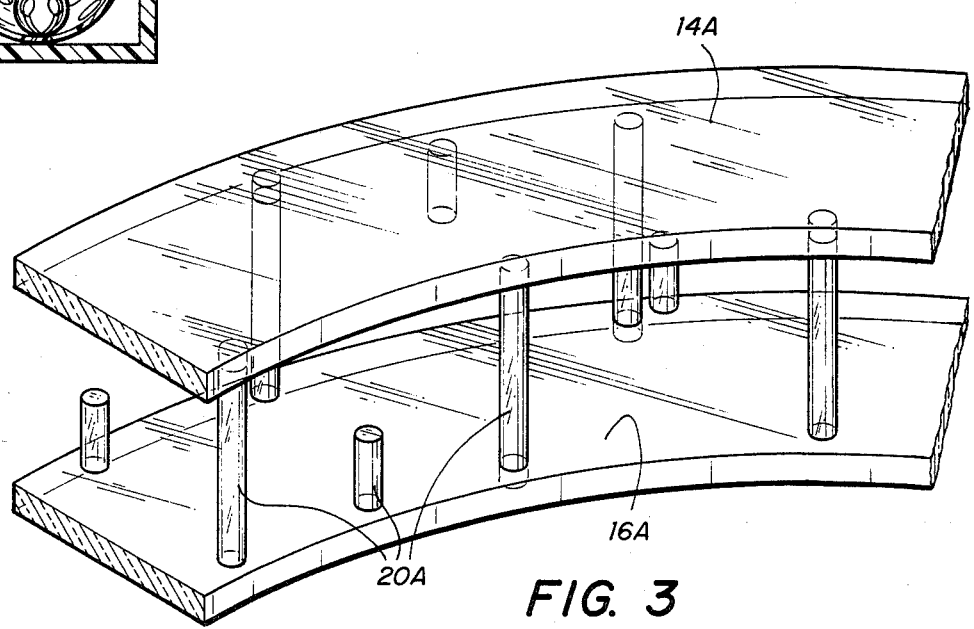
FIG. 3 is a fragmentary showing of another embodiment of a housing, wherein a series of vertical rods are used to connect the top and bottom pieces (in lieu of a solid wall).

Regardless of which kind of ball is chosen, it is believed to be desirable that the cat be able to see at least enough of the ball to appreciate the motion that comes from striking the ball. Hence, in some embodiments it may be advantageous to foster visibility of the ball by making at least a portion of some wall transparent. Also, the housing shown in FIG. 3 has vertical posts which serve as its connecting structures. In this embodiment a cat can see the ball through the spaces between adjacent posts 20A as well as through a transparent or translucent top 14A.

Figure 4:
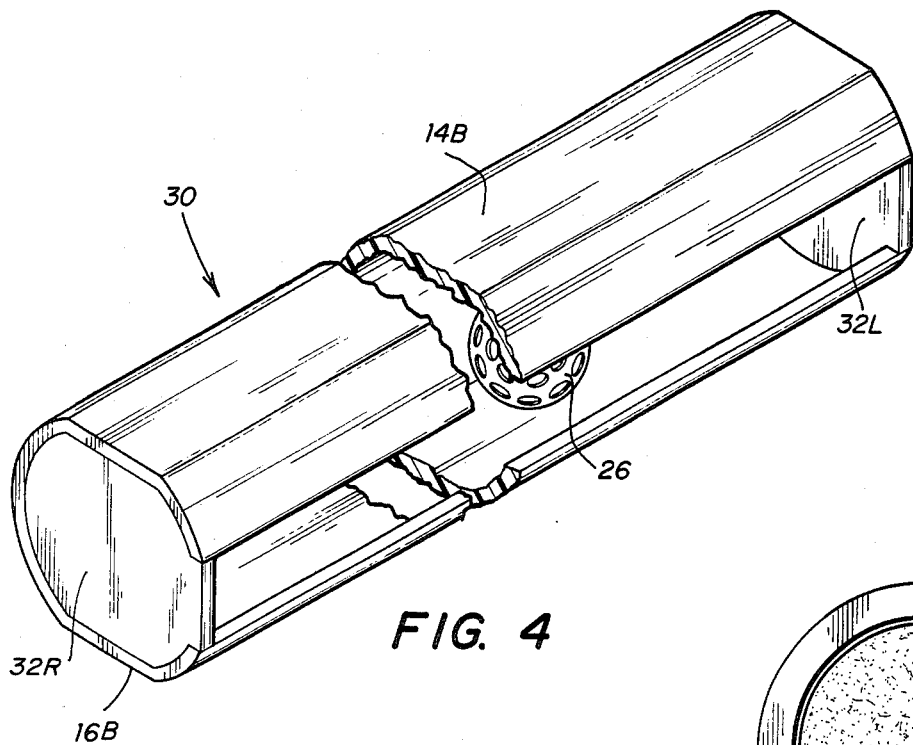
FIG. 4 is a perspective view of another embodiment of the invention in which the housing is linear instead of forming a continuous loop.

In addition to the annular or circular housing 12, other suitable configurations for a housing include the linear housing 30 shown in FIG. 4, which has a top 14B, a bottom 16B and right and left end panels 32R, 32L. The end panels are preferably made of a rigid and "solid" material so that the walls will cause a propelled ball to recoil with a large portion of the kinetic energy with which the ball strikes a panel. That is, it is preferred that a linear housing contribute to at least some of the entertainment that a ball would provide if it was thrown by a person against a brick wall and bounced across a room. One advantage of a toy like that shown in FIG. 4, however, is that the ball is captured and cannot bounce under a heavy piece of furniture and thereby become "lost" as far as the cat is concerned.

Figure 5:
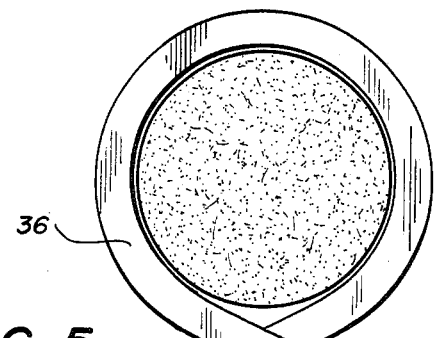
FIG. 5 is a top plan view of another embodiment of the invention in which the housing is shaped like the Arabic numeral eight.
Figure 6:
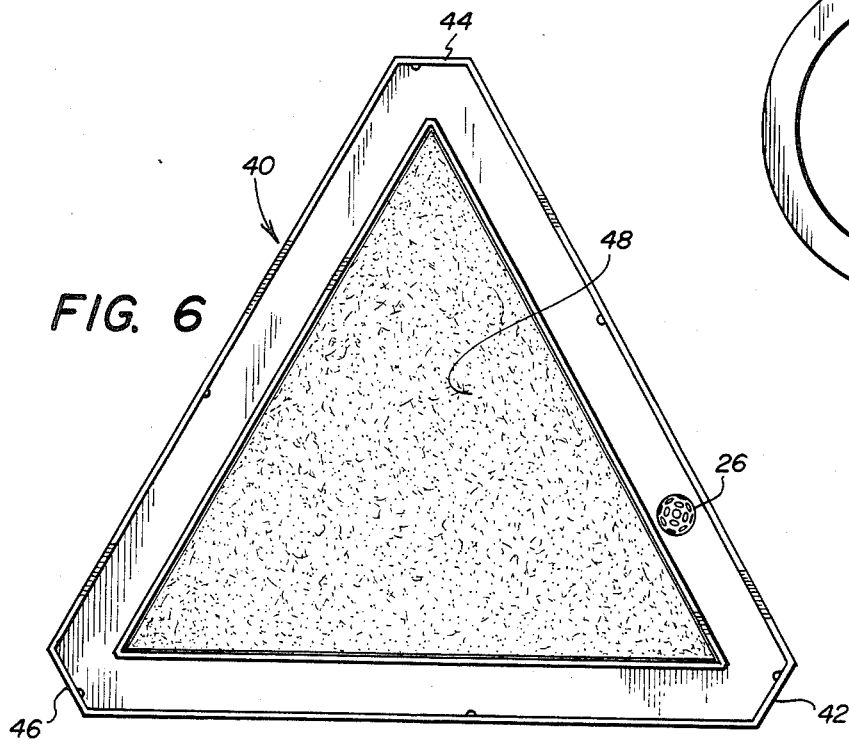
FIG. 6 is a top plan view of the "lower half" of a housing, showing a ball in place—before a top is installed so as to capture the ball in the housing.

Another configuration for a housing 36 is shown in FIG. 5, which may aptly be called a "FIG. 8" housing. An elongated slot in this particular embodiment may be pivoted alternately on the inside and outside walls, in contrast to the continuous slot 22 which is shown in FIG. 1. A generally triangular housing 40 is shown in FIG. 6, and the three deflector panels 42, 44, 46 are oriented such that they will tend to deflect a moving ball to the adjacent leg of the isosceles triangle; that is, a rapidly moving ball will tend to be diverted down an adjacent corridor rather than retracing its original path. Another feature shown in FIG. 6 is a central panel 48 which extends between the interior edges of the housing 40. This panel 48 is preferably covered with a carpet-like material, so that both humans and a cat may associate the panel 48 with a desirable sleeping spot. Of course, cats are more quick than people in recognizing good sleeping places for themselves. However, because it is people rather than cats that buy toys, it will probably be useful to advertise that the interior of the toy 10 makes an ideal sleeping spot after a cat has exhausted itself in chasing the ever-so-close but always unobtainable ball 26. A piece of carpet anchored to a central panel can also serve as a substitute for the scratching post that many people often provide for a cat to use in sharpening or exercising its claws—hoping that the cat will then ignore more valuable things such as table legs, etc.

The central panel 48 shown in FIG. 6 has boundaries which match the interior edges of the triangular housing, and so this particular panel is triangular. When the housing has annular features, as shown in FIGS. 1 and 5, a matching panel would of course be circular, as illustrated by the panel 48A in FIG. 5.

While only the preferred embodiments of the invention have been described herein in great detail, it should be apparent to those skilled in the art that modifications of the basic elements could be effected without departing from the spirit of the invention. For example, the elongated housing could be sized somewhat larger in order that the housing might contain a ball as large as a tennis ball, etc., even though smaller balls typically have less mass and are usually associated with faster movement and more bouncing action. Thus, a smooth and hard pingpong ball will normally be preferred over a tennis ball, if a person is trying to select a ball with optimum dynamic properties. Too, the "ball" need not be perfectly spherical or even symmetrical in order to provide the desired rolling or sliding contact with the bottom of the housing—in order to promote the "chase" aspects of the toy. And, other changes in the form of the invention may be apparent to those who consider themselves to be experts on cat behavior. Therefore, the scope of the invention should be understood to be limited only by the breadth of the claims appended hereto.

What is claimed is:

1. An article of manufacture having utility as a toy for entertaining domestic cats, comprising:
   (a) an elongated housing having a generally planar top, a generally planar bottom and two spaced structures in the nature of walls positioned between the top and bottom, and at least one of the two spaced structures connecting the top and bottom, and at least one of said spaced structures having an elongated and substantially continuous opening through which a cat can insert a paw, and the bottom having an internal configuration to support a ball in rolling contact, and the bottom having an external configuration such that the housing can rest in a stable condition on a generally horizontal surface, and the housing defining a closed loop in the form of an annulus and the inner diameter of the annular housing is about 12 inches, and wherein one of the spaced structures constitutes an interior wall having a height of about four inches, whereby the motion of a ball which is captured within the housing will be restricted by the shape of the closed loop, and whereby the housing may also serve as the circumferential frame for a bed within which the cat may curl up and sleep; and
   (b) a ball captured within the housing and adapted for rolling along the bottom of said housing, and the size of said ball being such that it will not pass throuh the elongated opening, whereby the cat may reach through the elongated opening in order to swat the ball and cause it to roll within the housing, but the cat is prevented from extracting the ball from said housing.

2. An article of manufacture having utility as a toy for entertaining domestic cats, comprising:
   (a) an elongated housing having a generally planar top, a generally planr bottom and two spaced structures in the nature of walls positioned between the top and bottom, and at least one of the two spaced structures connecting the top and bottom, and at least one of said spaced structures having an elongated and substantially continuous opening through which a cat can insert a paw, and the bottom having an internal configuration to support a ball in rolling contact, and the bottom having an external configuration such that the housing can rest in a stable condition on a generally horizontal surface, and the housing defining a closed loop such that the motion of a ball which is captured within the housing will be restricted by the shape of the closed loop, and wherein the top of the housing is selectively removable from the bottom, whereby the housing's interior may be cleaned and a substitute ball may be inserted as desired; and
   (b) a ball captured within the housing and adapted for rolling along the bottom of said housing, and the size of said ball being such that it will not pass through the elongated opening, whereby the cat may reach through the elongated opening in order to swat the ball and cause it to roll within the housing, but the cat is prevented from extracting the ball from said housing.

3. An article of manufacture having utility as a toy for entertaining domestic cats, comprising:
   (a) an elongated housing having a generally planar top, a generally planar bottom and two spaced structures in the nature of walls positioned between the top and bottom, and at least one of the two spaced structures connecting the top and bottom, and at least one of said spaced structures having an elongated and substantially continuous opening through which a cat can insert a paw, and the bottom having an internal configuration to support a ball in rolling contact, and the bottom having an external configuration such that the housing can rest in a stable condition on a generally horizontal surface, and the housing defining a closed loop which is shaped generally like an isosceles triangle, and further including deflector panels located at the three corners of the housing, such that a captured ball will be diverted to the adjacent leg of the triangular housing when it rolls to the end of any given leg of the housing, and whereby the motion of a ball which is captured within the housing will be restricted by the shape of the closed loop; and
   (b) a ball captured within the housing and adapted for rolling along the bottom of said housing, and the size of said ball being such that it will not pass through the elongated opening, whereby the cat may reach through the elongated opening in order to swat the ball and cause it to roll within the housing, but the cat is prevented from extracting the ball from said housing.

4. An article of manufacture having utility as a toy for entertaining domestic cats, comprising:
   (a) an elongated housing having a generally planar top, a generally planar bottom and two spaced structures in the nature of walls positioned between the top and bottom, and at least one of the two spaced structures connecting the top and bottom, and at least one of said spaced structures having an elongated and substantially continuous opening through which a cat can insert a paw, and the bottom having an internal configuration to support a ball in rolling contact, and the bottom having an external configuration such that the housing can rest in a stable condition on a generally horizontal surface, and the housing defining a closed loop and wherein the housing's two spaced structures constitute generally vertical walls which are fixed to the bottom and top at the respective edges thereof, and wherein the elongated opening is centrally located in its associated structure, whereby the transverse cross-section of the housing may be accurately described as generally C-shaped, and whereby the motion of a ball which is captured within the housing will be restricted by the shape of the closed loop; and (b) a ball captured within the housing and adapted for rolling along the bottom of said housing, and the size of said ball being such that it will not pass through the elongated opening, whereby the cat may reach through the elongated opening in order to swat the ball and cause it to roll within the housing, but the cat is prevented from extracting the ball from said housing.

5. An article of manufacture having utility as a toy for entertaining domestic cats, comprising:

(a) an elongated housing having a top, a bottom and two spaced structures in the nature of walls positioned between the top and bottom, and at least one of the two spaced structures connecting the top and bottom, and at least one of said spaced structures having an elongated opening through which a cat can insert a paw, and the bottom having a configuration to support a ball in rolling contact, and the housing being shaped so as to form a continuous loop, and further including a central panel which extends between the interior edges of the housing, and the panel being covered with a carpet-like material, whereby the covered panel may be recognized by humans as being functional as a bed for a cat; and (b) a ball captured within the housing and adapted for rolling along the bottom of said housing, and the size of said ball being such that it will not pass through the elongated opening, whereby the cat may reach through the elongated opening in order to swat the ball and cause it to roll within the housing, but the cat is prevented from extracting the ball from said housing.

6. The article as claimed in claim 5 wherein the housing is annular.

* * * * *